(12) United States Patent
Nozawa et al.

(10) Patent No.: US 6,483,722 B2
(45) Date of Patent: Nov. 19, 2002

(54) DC/DC CONVERTER AND CONTROL METHOD THEREOF

(75) Inventors: Takeshi Nozawa, Tokyo (JP); Yukihiro Nishikawa, Tokyo (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 09/992,545

(22) Filed: Nov. 7, 2001

(65) Prior Publication Data

US 2002/0080634 A1 Jun. 27, 2002

(30) Foreign Application Priority Data

Nov. 10, 2000 (JP) .................................... 2000-342864
Mar. 15, 2001 (JP) .................................... 2001-074656

(51) Int. Cl.[7] ..................... H02M 3/335; H02M 7/5387
(52) U.S. Cl. .......................... 363/17; 363/98; 363/132
(58) Field of Search ......................... 363/16, 17, 97, 363/98, 131, 132

(56) References Cited

U.S. PATENT DOCUMENTS

| | | | |
|---|---|---|---|
| 4,499,530 A | * | 2/1985 | Onda et al. ............... 363/17 |
| 5,438,497 A | * | 8/1995 | Jain ........................... 363/17 |
| 6,064,580 A | * | 5/2000 | Watanabe et al. .......... 363/17 |

* cited by examiner

*Primary Examiner*—Matthew Nguyen
(74) *Attorney, Agent, or Firm*—Rossi & Associates

(57) ABSTRACT

The present invention controls reactive current to be low so that expensive components are not required and costs are decreased. According to the present invention, serial circuits of two switching elements are connected between the positive and negative electrodes of a DC power supply, a tertiary winding 6 and a quaternary winding are added to a transformer of a DC/DC converter where a serial circuit of a capacitor and a transformer primary winding are connected to the switching element in parallel, an ON/OFF signal is applied to the switching element via the tertiary winding, the quaternary winding becomes a winding for the power supply of a control circuit, the timing of the switching of the positive/negative of the quaternary winding voltage is detected by this control circuit, and an ON/OFF signal is applied to the switching element at this timing. By decreasing the ON time of the switching element, the reactive current can be decreased.

7 Claims, 7 Drawing Sheets

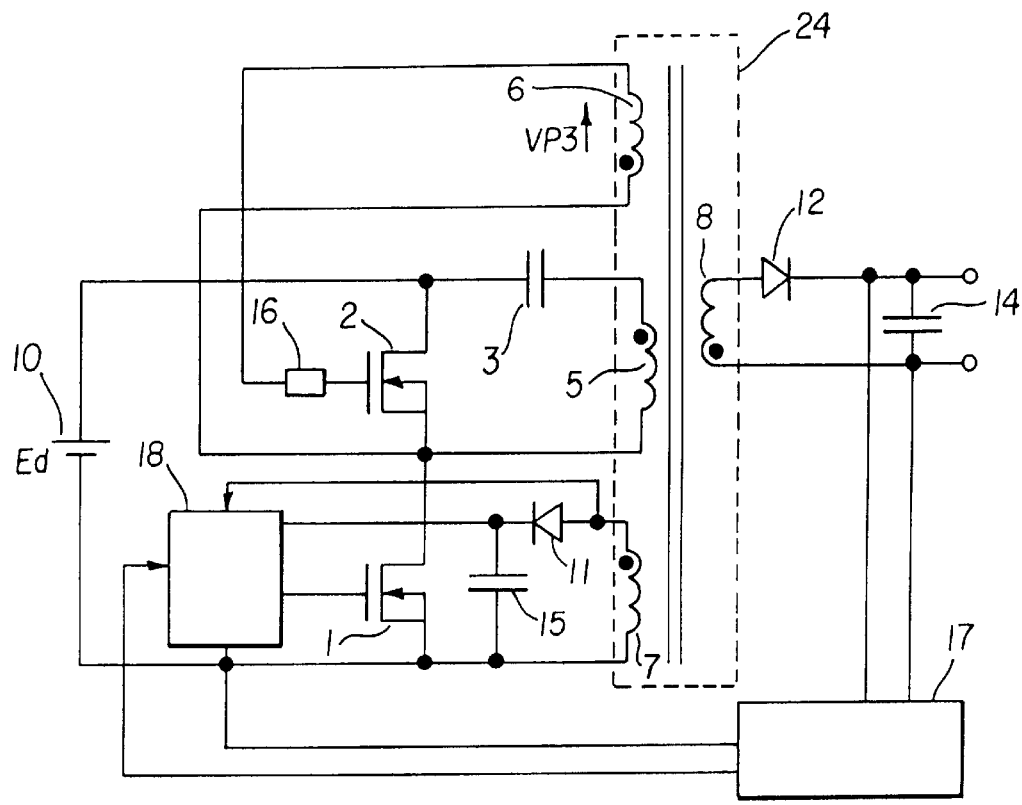
FIG. 5
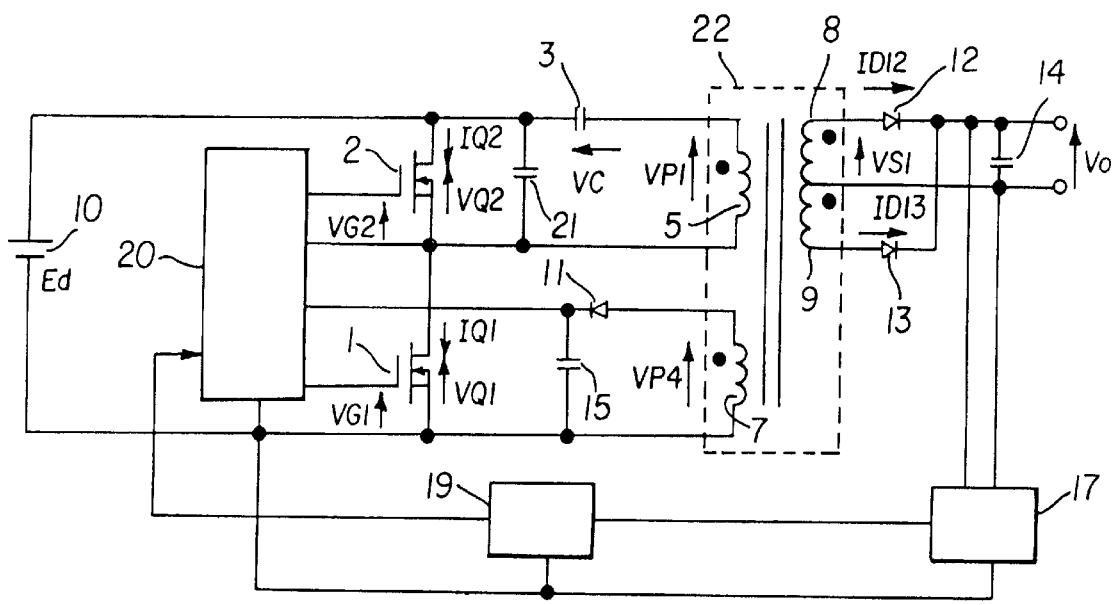
PRIOR ART     FIG. 6

PRIOR ART

PRIOR ART

DC/DC CONVERTER AND CONTROL METHOD THEREOF

BACKGROUND OF THE INVENTION

1. Field of the Invention

The present invention relates to a DC/DC converter with a half bridge configuration, and the control method thereof.

2. Description of the Related Art

FIG. 6 shows a prior art example of a DC/DC converter that includes a series circuit of a MOSFET (Metal Oxide Semiconductor Field-Effects Transistor) 1 and MOSFET 2, which are connected to a DC power supply 10 in parallel, and a series circuit of a capacitor 3, a transformer primary winding 5 and a snubber capacitor 21, which are connected to the MOSFET 2 in parallel respectively. The secondary side of a transformer 22 comprises 2 windings, 8 and 9, and a rectifying and smoothing circuit which further comprises diodes 12, 13 and capacitor 14. In order to maintain a smoothed DC output voltage at a predetermined level, an output voltage detection circuit 17 and a frequency and phase control circuit 19 are disposed to perform feedback control. For the circuit to drive each gate of the MOSFET 1 and 2, a high voltage driver IC (Integrated Circuit) 20 is used.

FIG. 7 shows the timing chart for the operation of the DC/DC converter shown in FIG. 6; the operation of which will now be described. At first, MOSFET 1 is turned ON in period [1], then the resonance current, by the capacitor 3 and the leakage inductance of the transformer 22 and the exciting current of the transformer 22, flow via the DC power supply 10 to capacitor 3, to transformer primary winding 5, to MOSFET 1, and the capacitor 3 is charged. At this time, the difference voltage VP1 between the DC power supply voltage Ed and the voltage VC across the capacitor 3 is applied to the transformer primary winding 5. The voltage VS1 generated at the transformer secondary winding 8 is rectified and smoothed by the diode 12 and the capacitor 14, and power is supplied to the load. The transformer secondary winding voltage VS1 rises in proportion to the transformer primary winding voltage VP1 (indicated by dotted lines in FIG. 7). The diode 12 conducts when the transformer secondary winding voltage VS1 reaches the output voltage Vo, and therefore the voltage VS1 is clamped to the output voltage Vo. The difference voltage between the dotted lines and the solid lines in FIG. 7 is applied to the leakage inductance of the transformer 22.

In period [2], the transformer primary winding voltage VP1 gradually drops, and when the voltage in proportion to the transformer primary winding voltage VP1 becomes lower than the output voltage Vo, the diode 12 is blocked, and the diode current ID12 becomes zero. In the MOSFET 1, the exciting current of the transformer 22, excited during period [1], flows continuously.

When the MOSFET 1 is turned OFF in period [3], the exciting current of the transformer 22 is commutated to the snubber capacitor 21 and the output capacitance of the MOSFET 1 and 2, and the voltage VQ1 across the MOSFET 1 gradually rises and the voltage VQ2 across the MOSFET 2 gradually drops.

When the voltage VQ2 across the MOSFET 1 reaches the DC power supply voltage Ed in period [4], the exciting current of the transformer 22 is commutated to the parasitic diode of the MOSFET 2. At this time, by turning the MOSFET 2 ON, the resonance current and the exciting current of the transformer 22 flow via the capacitor 3 to MOSFET 2, to transformer primary winding 5, and the capacitor 3 is discharged. The difference voltage VP1 between the DC power supply voltage Ed and the voltage across the capacitor 3 is applied to the transformer primary winding 5, and therefore the transformer 22 is reset. At this time, the voltage generated at the transformer secondary winding 9 is rectified and smoothed by the diode 13 and the capacitor 14, and power is supplied to the load.

Since operation in period [4] to [6] is the same as in period [1] to [3], a description thereof is omitted here.

By repeating the series of operations from period [1] to [6], power is supplied from the DC power supply 10 to the load.

Now the operation when the load is light will be described with reference to FIG. 8. When the load is light, the frequency and phase control circuit 19 is adjusted so that the switching frequency does not increase, and the MOSFET 1 or MOSFET 2 is turned OFF when a predetermined time elapses after the transformer secondary current ID12 and ID13 become zero. The current IQ 1 and 2, which flows through the MOSFET 1 and 2 becomes roughly equal to the exciting current of the transformer 22.

In the above prior art, each MOSFET alternately switches from rated load to no load at a 50% duty, and controls the current to be supplied to the load by adjusting the voltage to be applied to the transformer primary winding with respect to the changes of the load using the output voltage detection circuit and the frequency and phase control circuit, so that output voltage becomes constant. With this method however, a value of the exciting current which flows through the exciting inductance of the transformer hardly changes from rated load to no load, so this exciting current becomes reactive current, loss is generated by the impedance in the circuit (e.g. the ON resistance of a MOSFET and the winding resistance of a transformer), and as a result, efficiency when the load is light drops.

Also the potential of the source terminal of the MOSFET, which is connected to the positive electrode of the DC power supply, is different from the potential of the source terminal of the MOSFET which is connected to the negative electrode of the DC power supply, so it is necessary to insulate signals which drive the MOSFET at the positive electrode side by a pulse transformer, or to use an expensive high voltage driver IC which has a level shift function, resulting in the system becoming large and costs increasing.

In view of the above, it would be desirable to control reactive current to be low and to lower costs by not using expensive components.

SUMMARY OF THE INVENTION

To overcome the deficiencies of conventional devices, a DC-DC converter according to the present invention is characterized in that serial circuits of two switching elements are connected in parallel between the positive electrode and the negative electrode of a DC power supply, a serial circuit of at least one capacitor and a transformer primary winding is connected to one of the switching elements in parallel, an ON/OFF signal is supplied to the switching element connected to the positive electrode side of the DC power supply from the tertiary winding of the transformer, the quaternary winding of the transformer is used for the power supply of a control circuit, the timing of the switching of positive/negative of the quaternary winding voltage is detected by the control circuit, and an ON/OFF signal is applied to the switching element connected to the negative electrode side of the DC power supply at this timing, so that half wave rectification or full wave rectification is performed on the positive/negative voltage generated at the secondary winding of the transformer, and DC output is obtained.

In the DC-DC converter, the switching element connected to the negative electrode side of the DC power supply turns ON when a short circuit prevention period has elapsed after the voltage of the transformer quaternary winding switches from positive to negative or from negative to positive, compares the reference voltage value, which increases in proportion to the time from the switching element ON or the voltage switching timing of the transformer quaternary winding, and when the reference voltage exceeds this voltage detection value, the switching element is turned OFF so that the DC output voltage becomes constant.

Furthermore, a predetermined offset can be provided so that the minimum value of the reference voltage becomes greater than the minimum value of the secondary side output voltage detection value. Furthermore, when it is detected that the secondary side output voltage detection value exceeds the reference voltage, a drive signal is applied to the switching element connected to the negative electrode side of the DC power supply at the timing of a rise or fall of a rectangular wave signal, which is oscillated at a predetermined frequency, so as to prevent an error stop of the DC/DC converter.

In the DC-DC converter according to the present invention, when the occurrence of switching of the voltage of the transformer quaternary winding from positive to negative or from negative to positive is detected, and no switching is detected, a drive signal is applied to the switching element connected to the negative electrode side of the DC power supply so as to prevent an error stop of the DC/DC converter, or when ON of the switching element connected to the positive electrode side of the DC power supply is detected from the voltage of the transformer quaternary winding while the switching element connected to the negative electrode side of the DC power supply is ON, the switching element connected to the negative electrode side of the DC power supply is turned OFF so as to prevent an arm short circuit, or when it is detected that the switching element connected to the positive electrode of the DC power supply is OFF from the voltage of the transformer quaternary winding with respect to the timing of the switching of the intermittent signal, which intermittently oscillates and drives the switching element connected to the positive electrode side of the DC power supply, from the switching stop period to the switching period, the intermittent signal is switched from the switching stop period to the switching period so as to prevent an arm short circuit.

BRIEF DESCRIPTION OF THE DRAWINGS

The invention will be described with reference to certain preferred embodiments thereof along with the accompanying drawings, wherein:

FIG. 5 is a circuit diagram depicting the second embodiment of the present invention;

FIG. 6 is a circuit diagram depicting prior art;

DESCRIPTION OF THE PREFERRED EMBODIMENTS

Figure 1:
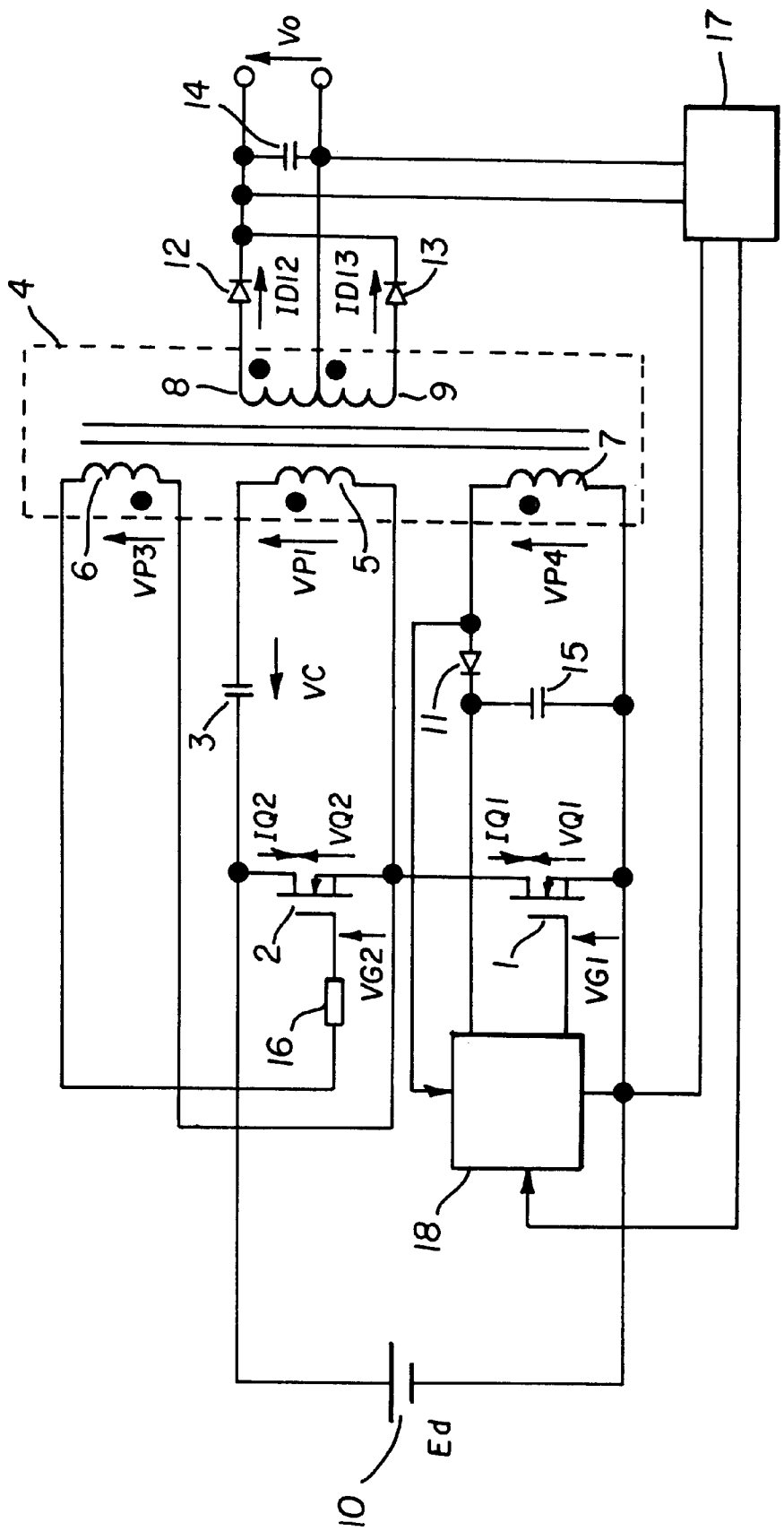
FIG. 1 is a circuit diagram depicting the first embodiment of the present invention.

FIG. 1 is a circuit diagram depicting an embodiment of the present invention. The features are that the transformer tertiary winding 6 and the quaternary winding 7 are added to the transformer 22 of the conventional circuit shown in FIG. 6, which is the transformer 4, the transformer tertiary winding 6 is connected to the gate of MOSFET 2 via the resistor 16, half wave rectification is performed on the voltage VP4 of the transformer quaternary winding 7 by the diode 11 and the capacitor 15 to be the power supply voltage of the control circuit 18, and the transformer quaternary winding 7 is connected to the control circuit 18 to detect the switching of the voltage thereof. The snubber capacitor, which is connected in parallel with MOSFET 2, is not illustrated here.

Figure 2:
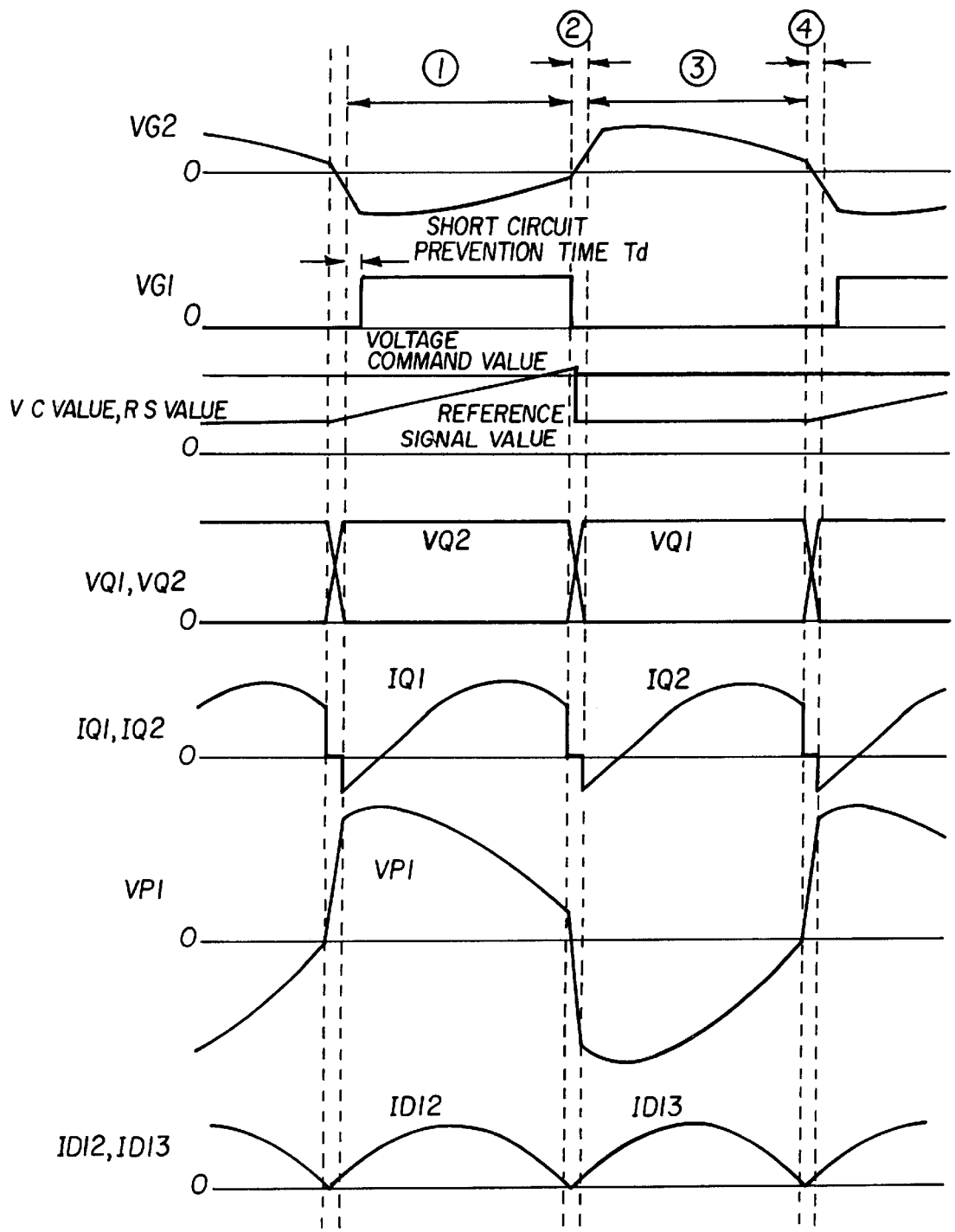
FIG. 2 is a time chart depicting the operation in FIG. 1.

FIG. 2 shows the timing chart of the device illustrated in FIG. 1, the operation of which will now be described in greater detail. In period [1], the MOSFET 1 turns ON when the short circuit prevention period Td elapses from the timing when the voltage VP4 of the transformer quaternary winding 7 switches from negative to positive. By this, the resonance current by the capacitor 3 and the leakage inductance of the transformer 4 and the exciting current of the transformer 4 flow via the DC power supply 10 to capacitor 3, to transformer primary winding 5, to MOSFET 1, and the capacitor 3 is charged. At this time, the difference voltage VP1 between the DC power supply voltage Ed and the voltage VC across the capacitor 3 is applied to the transformer primary winding 5, and the voltage generated at the transformer secondary winding 8 is rectified and smoothed by the diode 12 and the capacitor 14, and power is supplied to the load.

The output voltage detection circuit 17 detects the value of the secondary side output voltage Vo, shown as the output voltage instruction value in FIG. 2. The control circuit 18 forms the reference signal, which increases in proportion to time after the timing when the voltage VP1 of the transformer primary winding switches from negative to positive. In the control circuit 18, the reference signal and the secondary side output voltage detection value are compared. The control circuit 18 turns MOSFET 1 OFF when the reference signal value exceeds the output voltage detection value. However, when the voltage VP4 of the transformer quaternary winding 7 drops (voltage VP3 of the transformer tertiary winding 6 rises) due to the state of the load before the reference signal value exceeds the output voltage detection value, the control circuit 18 detects the timing when VP4 switches from positive to negative, and turns MOSFET 1 OFF. By this, the generation of an arm short circuit, such as a state when MOSFET 2 turns ON while MOSFET 1 is ON, is prevented. When MOSFET 1 turns OFF, the voltage VP1 of the transformer primary winding 5 switches from positive to negative. Voltages VP3 and VP4 in proportion to the voltage VP1 of the transformer primary winding 5 are generated at the transformer tertiary winding 6 and the transformer quaternary winding 7. The polarity of the voltage VP3 of the transformer tertiary winding 6 is positive and the polarity of the voltage VP4 of the transformer quaternary winding 7 is negative. At the timing when MOSFET 1 turns OFF, the current ID12 which flows through the diode 12 is zero, and the current which MOSFET 1 turns OFF is only the exciting current of the transformer 4.

In period [2], when MOSFET 1 is turned OFF, the exciting current of the transformer 4 is commutated to the output capacitance of the MOSFET 1 and 2, and the voltage of the MOSFET 1 and 2 gradually rises or drops.

In period [3], when the voltage of the MOSFET 1 reaches the DC power supply voltage Ed, the exciting current of the transformer 4 is commutated to the parasitic diode of the MOSFET 2. At this time, if the voltage VP3 of the transformer tertiary winding 6 exceeds the gate threshold value of the MOSFET 2, the MOSFET 2 turns ON, the resonance current and the exciting current of the transformer 4 flows via the capacitor 3 to MOSFET 2, to transformer primary winding 5, and the capacitor 3 is discharged. Also the difference voltage VP1 of the DC power supply voltage Ed and the voltage VC across the capacitor 3 is applied to the transformer primary winding 5, and voltage generated at the transformer secondary winding 9 is rectified and smoothed by the diode 13 and the capacitor 14, and power is supplied to the load. When the resonance current drops, the voltage VP3 of the transformer tertiary winding 6 drops, and when the voltage VP3 becomes less than the gate threshold value of the MOSFET 2, the MOSFET 2 turns OFF. At the timing when the MOSFET 2 turns OFF, the current ID13 which flows through the diode 13 is zero, and the current which the MOSFET 2 turns OFF is only the exciting current of the transformer 4.

When the MOSFET 2 turns OFF in period [4], the voltage VP1 of the transformer primary winding 5 changes from negative to positive. Voltages in proportion to the voltage of the transformer primary winding 5 are generated at the transformer tertiary winding 6 and the transformer quaternary winding 7. The polarity of the voltage VP3 of the transformer tertiary winding 6 is negative, and the polarity of the voltage VP4 of the transformer quaternary winding 7 is positive. The exciting current of the transformer 4 is commutated to the parasitic capacitance of the capacitor 3 and the MOSFET 1 and 2, and the voltage of the MOSFET 1 and 2 gradually drops or rises. In period [1], when the voltage VQ2 of the MOSFET 2 reaches the DC power supply voltage Ed, the exciting current of the transformer 4 is commutated to the parasitic diode of the MOSFET 1. By repeating this series of operations hereafter, power is supplied from the DC power supply 10 to the load.

For the output stage of the output voltage detection circuit 17, a photo-coupler is generally used to electrically insulate signals from the secondary side, but the minimum value of the output voltage detection value does not drop below the saturation voltage of the secondary side transistor of the photo-coupler. Therefore when the minimum value of the reference voltage signal is smaller than the minimum value of the output voltage detection value, the MOSFET 1 always turns ON/OFF at each switching cycle, so the secondary side output voltage may have an over-voltage, exceeding the setup voltage, when the load is light or when the load suddenly changes.

To solve this problem, an offset is created so that the minimum value of the reference voltage signal becomes greater than the minimum value of the output from the output voltage detection circuit 17, and if the output value from the output voltage detection circuit 17 becomes smaller than the minimum value of the reference voltage signal, the MOSFET 1 is controlled not to turn ON so as to not continue switching, and as a result, an over-voltage of the secondary side output voltage can be prevented.

Figure 3:
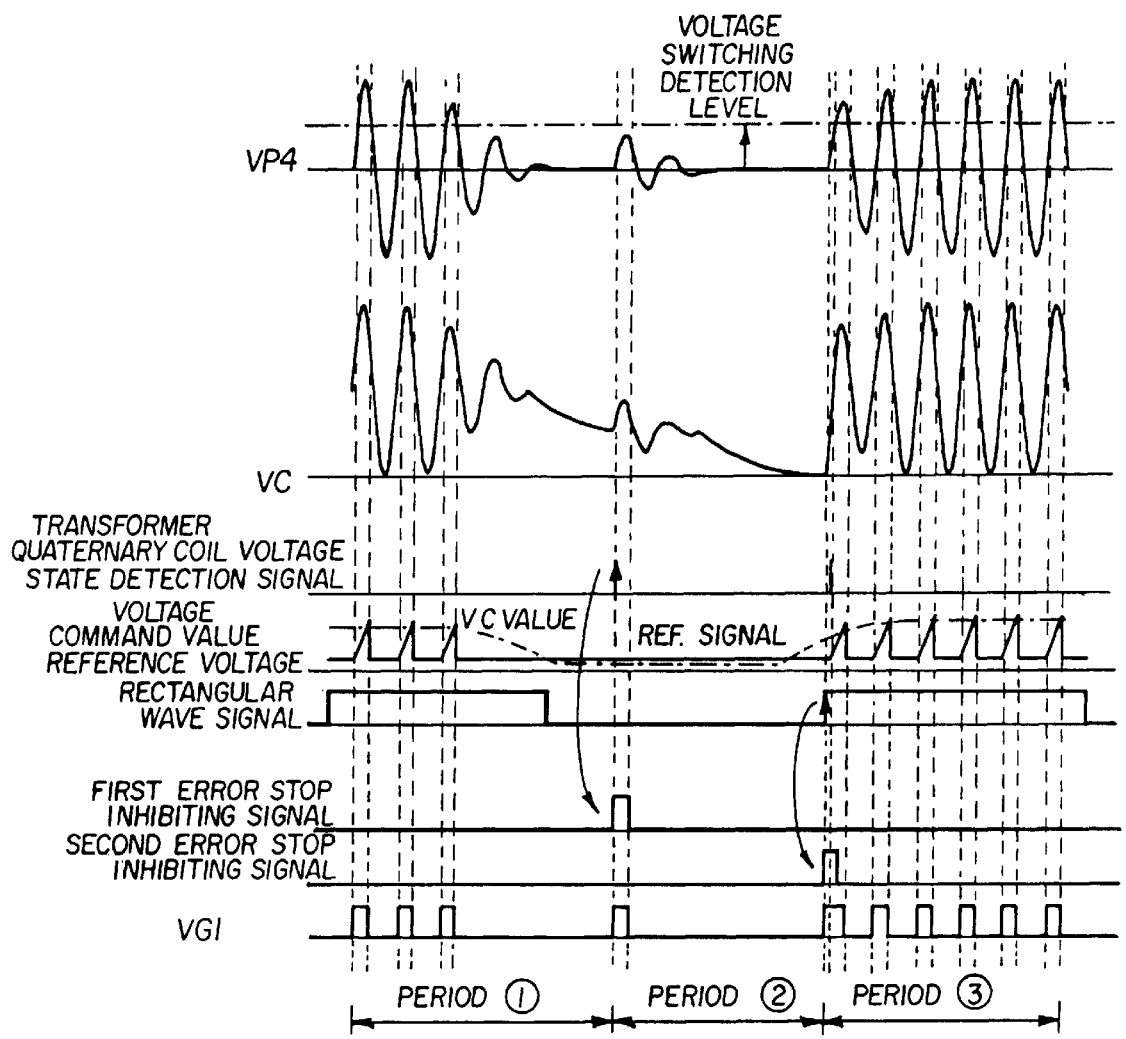
FIG. 3 is a diagram depicting the error stop prevention operation of the DC/DC converter in FIG. 1.

By reference to FIG. 3, the operation of the control circuit 18 for controlling an error stop of the DC/DC converter according to the present invention will now be described. Period [1] shows a state when the load suddenly changes, and the output voltage Vo rises and the voltage command value is dropped by feedback control (switching stop). Period [1] also indicates that MOSFET 1 and 2 are stopped in a state where charge remains in the capacitor 3 in the circuit operating state. The charge of the capacitor 3 are gradually discharged by impedance in the circuit. Period [2] shows the state when the first error stop inhibiting circuit, which activates the stop of the voltage switching of the transformer quaternary winding 7, detects a failed operation. If the capacitor 3 has not been sufficiently discharged at this time, voltage to be applied to the transformer primary winding 5 decreases, and even if a drive signal is applied to the MOSFET 1, voltage generated at the transformer tertiary winding 6 and quaternary winding 7 also decreases, and in some cases switching cannot be continued.

Period [3] shows the state when the output voltage Vo returns to the normal value, the voltage command value rises, and the charge of the capacitor 3 have been sufficiently discharged. At this time, if a drive signal (second error stop inhibiting signal) is applied to the MOSFET 1 at the timing when the rectangular wave signal with a predetermined frequency changes (rise [of the signal] in this case), sufficient voltage is generated at the transformer tertiary winding 6 and quaternary winding 7, and MOSFET 1 and 2 can perform switching repeatedly. To promote the discharge of the capacitor 3, a discharge resistor can be connected in parallel with the capacitor 3.

Figure 4:
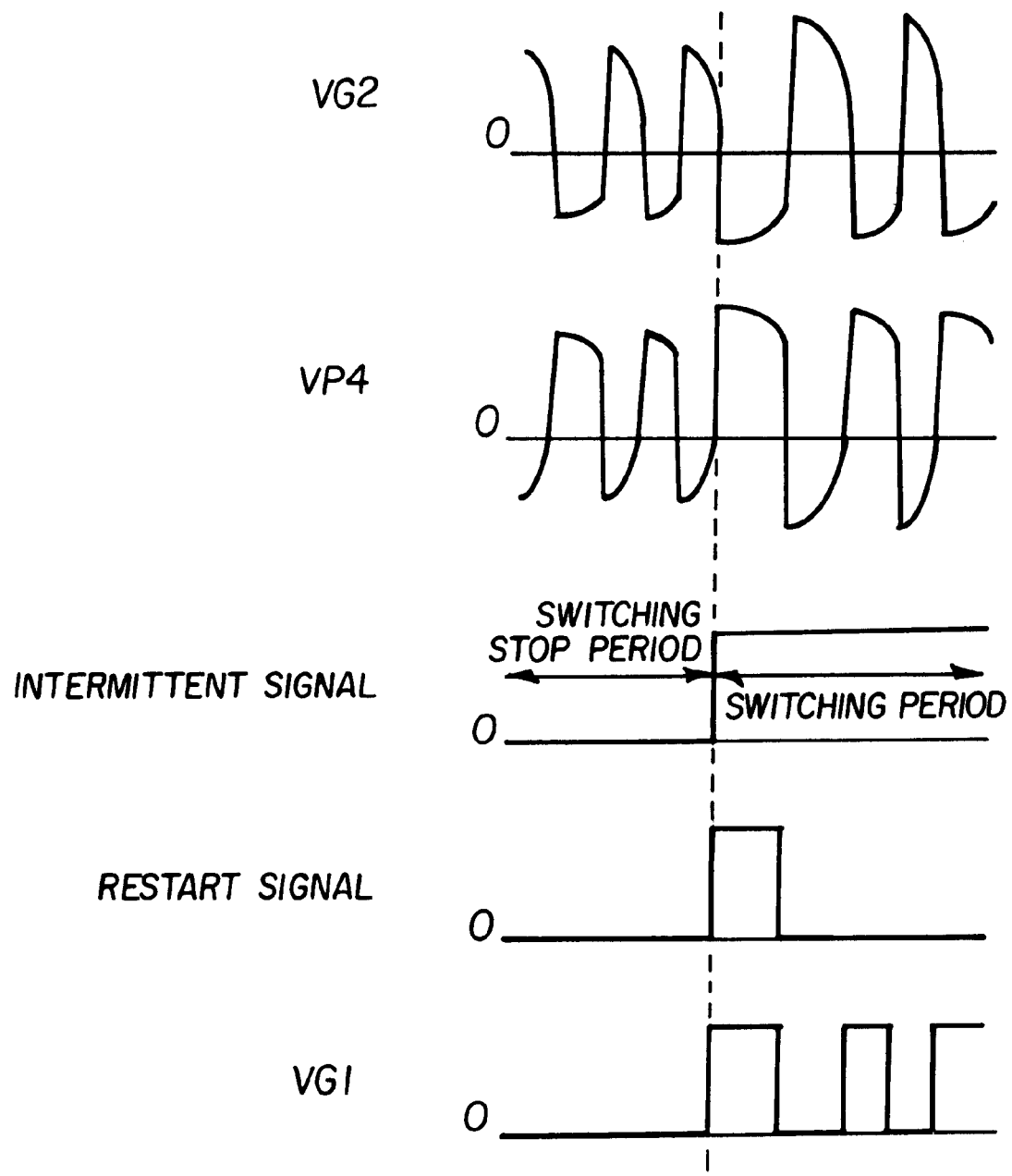
FIG. 4 is a diagram depicting the arm short circuit prevention operation during the intermittent operation in FIG. 1.
Figure 7:
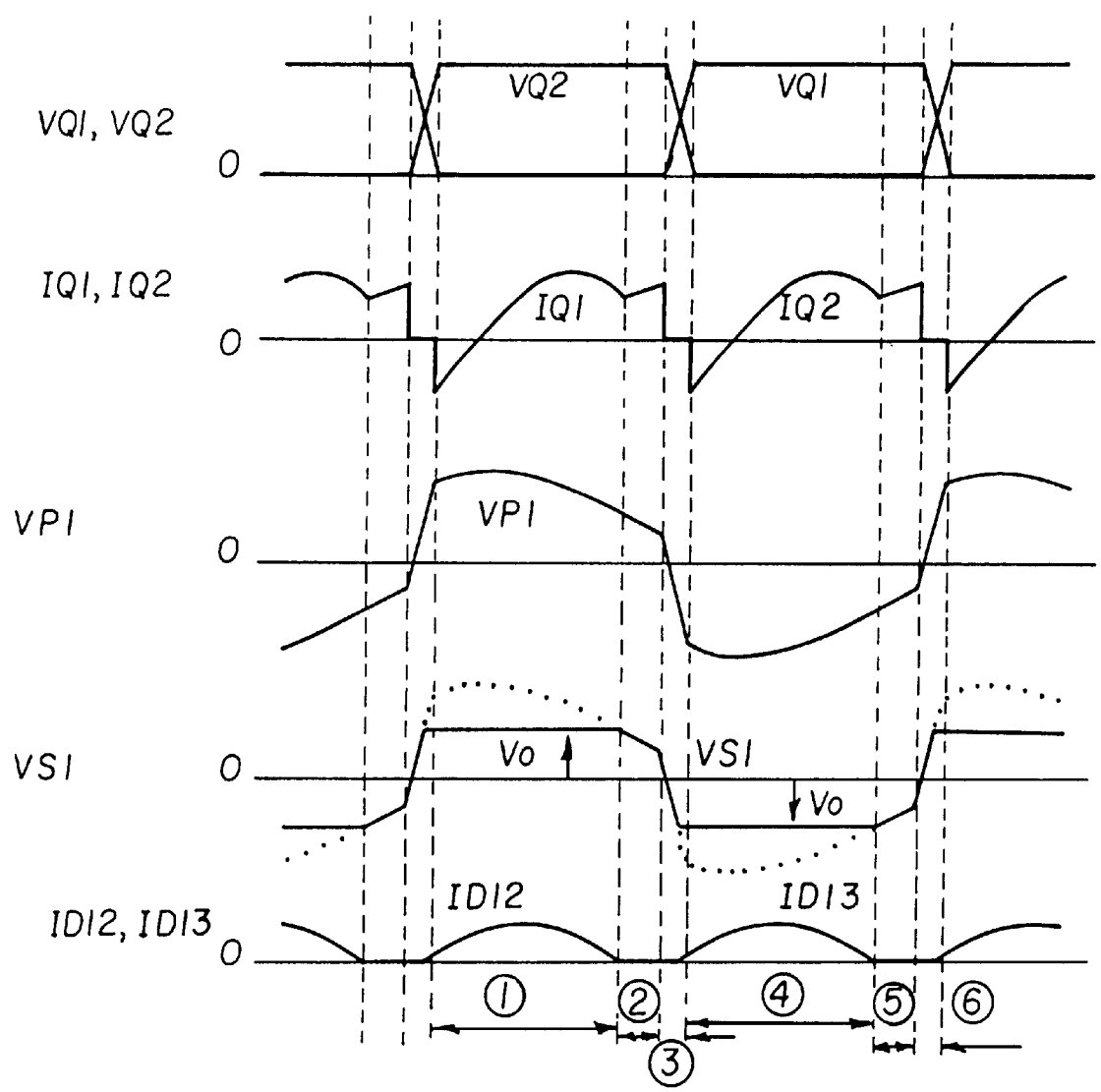
FIG. 7 is a time chart depicting the operation in FIG. 6.
Figure 8:
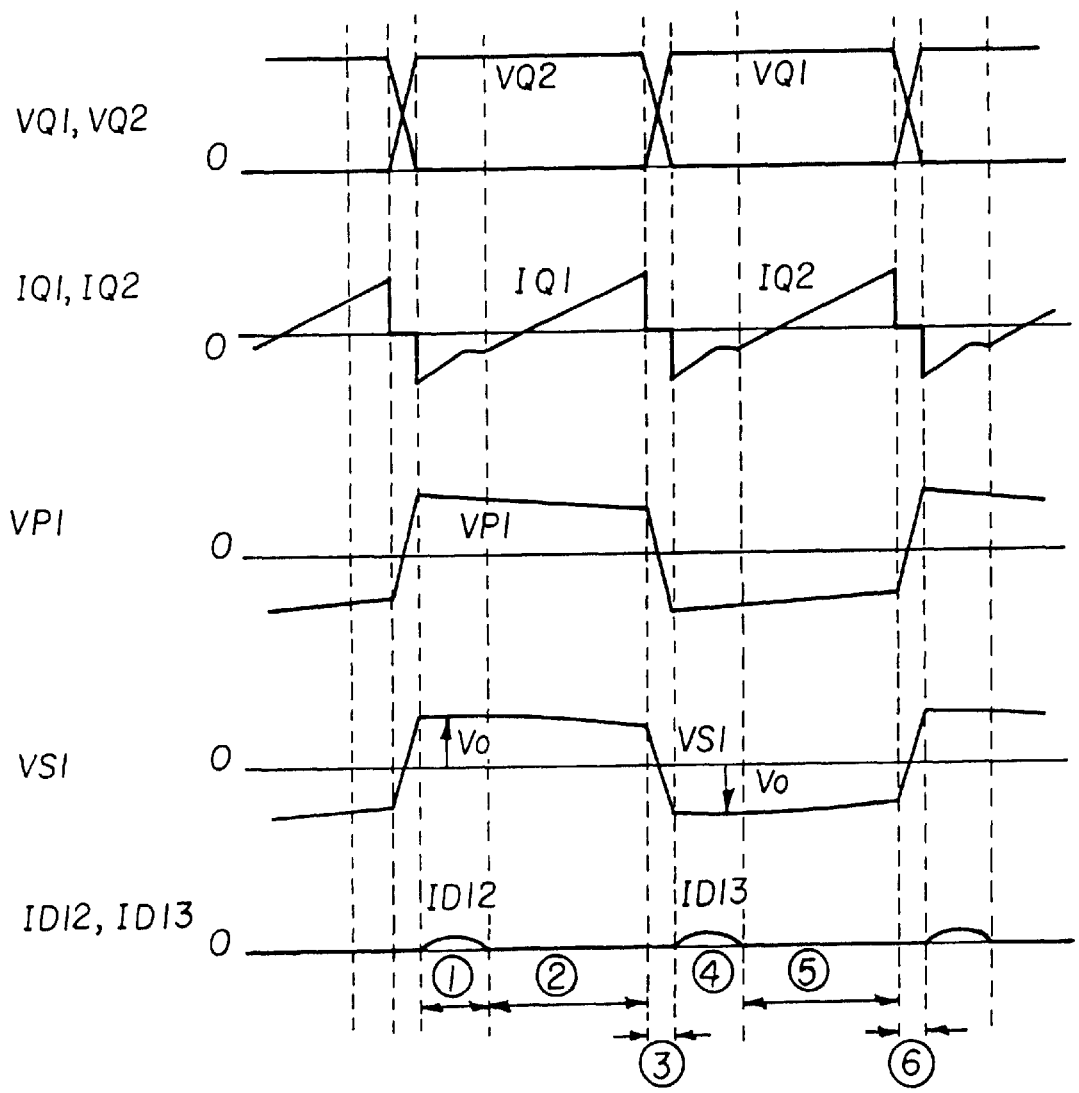
FIG. 8 is a diagram depicting the operation in FIG. 6 when the load is light.

FIG. 4 is a time chart depicting the intermittent operation of the DC/DC converter according to the present invention. This intermittent operation is for decreasing the loss generated at each part and for controlling the input power to be low by intentionally stopping the switching of the MOSFET when the load is light. If the switching stop period is short during the intermittent operation, the voltage change of the transformer tertiary winding 6 does not stop immediately, even if the switching of the MOSFET 1 is stopped, and MOSFET 2 continues switching. If MOSFET 2 is ON when a switching stop period ends and MOSFET 1 is turned ON, a heavy current flows in the route of the DC power supply 10 to MOSFET 2, to MOSFET 1 (arm short circuit), and the circuit may be destroyed. The transformer quaternary winding 7 is therefore monitored by the control circuit 18, and when MOSFET 2 is OFF (when voltage VP4 is normal voltage or when the switching of the voltage of the transformer quaternary winding 7 is stopping), a restart signal is output and MOSFET 1 is turned ON.

FIG. 5 is a circuit diagram depicting the second embodiment of the present invention. As FIG. 5 shows, the feature of this example is that a flyback connecting is used for performing half wave rectification on the voltage generated at the secondary winding of the transformer 24. Therefore power is supplied from the DC power supply 10 to the load only when the MOSFET 1 is OFF. The rest [of the operation] is the same as FIG. 1, so details are omitted here.

According to the present invention, pulse width control is performed in addition to changing the switching frequency with respect to the changes of the input voltage and the load, so the ON time of the switching element connected to the negative electrode can be decreased when the load is light, as a result loss generated by the impedance in the circuit due to reactive current can be decreased, and the drop of efficiency when the load is light can be controlled. Also when a switching element at the high voltage (positive electrode) side is driven, a relatively expensive high voltage driver IC or pulse transformer is not required, so costs can be decreased and circuit size can be decreased.

In addition, by controlling the secondary side output voltage detection value to be lower than the minimum value of the reference voltage, the switching element at the negative electrode side of the DC power supply is set to OFF, and unnecessary switching is stopped when the secondary output voltage is about to rise higher than the setup voltage, therefore the generation loss of the switching element can be decreased, and an over-voltage of the secondary side output voltage can be prevented.

When it is detected that the secondary side output voltage detection value exceeds the reference voltage, on the other hand, a drive signal is applied to the switching element connected to the negative electrode side of the DC power supply at the rise or fall of the timing of a rectangular wave signal which oscillates at a predetermined frequency, so as to prevent an error stop of the DC/DC converter, therefore a power supply with high reliability can be implemented.

What is claimed is:

1. A DC/DC converter comprising:
    a serial circuit including two switching elements connected between a positive electrode and a negative electrode of a DC power supply, wherein one of the switching elements is connected to the positive electrode side of said DC power supply and the other switching element is connected to the negative electrode side of said DC power supply;
    a transformer having a primary winding, a secondary winding, a tertiary winding and a quaternary winding;
    a serial circuit of at least one capacitor and said primary winding connected in parallel to one of said switching elements;
    a rectifying and smoothing circuit for outputting DC output voltage connected to said secondary winding; and
    a circuit means for forming an ON/OFF signal applied to the switching element connected to the positive electrode side of said DC power supply from said tertiary winding;
    wherein said quaternary winding is used for the power supply of a control circuit, a timing of the switching of the positive/negative of the quaternary winding voltage is detected by the control circuit, and an ON/OFF signal is applied to the switching element connected to the negative electrode side of the DC power supply in response to the timing, so that half wave rectification or full wave rectification is performed on the positive/negative voltage generated at the secondary winding of the transformer and DC output is thus obtained.

2. A DC/DC converter according to claim 1, wherein the switching element connected to the negative electrode side of said DC power supply turns ON when a short circuit prevention period has elapsed after the voltage of the transformer quaternary winding switches from positive to negative or from negative to positive, said switching element compares a reference voltage, which increases in proportion to the time from the switching element ON or the voltage switching timing of the transformer quaternary winding, with a secondary side output voltage detection value, and when said reference voltage exceeds the output voltage detection value, said switching element is turned OFF.

3. The DC/DC converter according to claim 2, wherein a predetermined offset is created so that a minimum value of said reference voltage becomes greater than a minimum value of said secondary side output voltage detection value.

4. The DC/DC converter according to claim 2 or claim 3, wherein, when said secondary side output voltage detection value exceeds said reference voltage, a drive signal is applied to the switching element connected to the negative electrode side of said DC power supply at the timing of the rise or the fall of a rectangular wave signal which is oscillated at a given predetermined frequency so as to prevent an error stop of said DC/DC converter.

5. The DC/DC converter according to claim 1, wherein, when the occurrence of switching of the voltage of said transformer quaternary winding from positive to negative or negative to positive is detected, and when no such switching is detected, a drive signal is applied to the switching element connected to the negative electrode side of said DC power supply so as to prevent an error stop of said DC/DC converter.

6. The DC/DC converter according to claim 1, wherein, when an ON state of the switching element connected to the positive side of the DC power supply is detected from the voltage of the transformer quaternary winding while the switching element connected to the negative electrode side of said DC power supply is ON, said switching element connected to the negative electrode side of said DC power supply is turned OFF, so as to prevent an arm short circuit.

7. The DC/DC converter according to claim 1, wherein, when it is detected that the switching element connected to the positive electrode of said DC power supply is OFF from the voltage of the transformer quaternary winding with respect to the timing of the switching of the intermittent signal, which intermittently oscillates and drives the switching element connected to said positive electrode side of said DC power supply from the switching stop period to the switching period, the intermittent signal is switched from the switching stop period to the switching period so as to prevent an arm short circuit.

* * * * *

UNITED STATES PATENT AND TRADEMARK OFFICE
CERTIFICATE OF CORRECTION

| | |
|---|---|
| PATENT NO. | : 6,483,722 B2 |
| APPLICATION NO. | : 09/992545 |
| DATED | : November 19, 2002 |
| INVENTOR(S) | : Nozawa et al. |

It is certified that error appears in the above-identified patent and that said Letters Patent is hereby corrected as shown below:

Column 8,
Line 47, "positive" should read -- negative. --.

Signed and Sealed this

Twentieth Day of June, 2006

JON W. DUDAS
*Director of the United States Patent and Trademark Office*